(No Model.)
W. C. LATHROP.
GRAIN DRILL ATTACHMENT.
No. 322,187. Patented July 14, 1885.
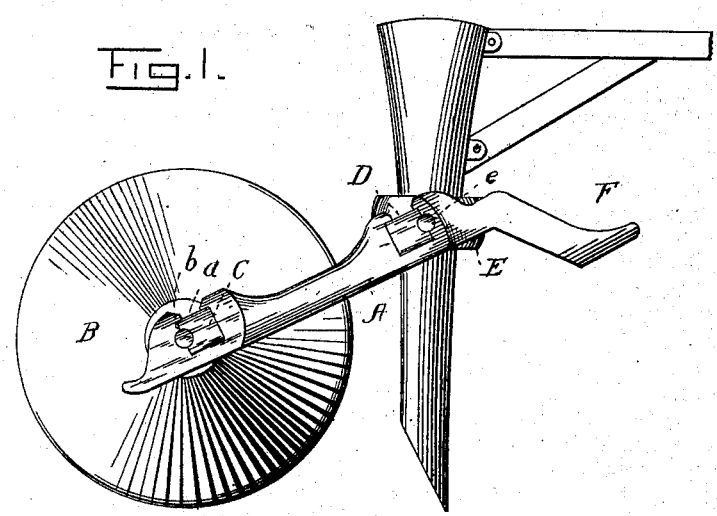
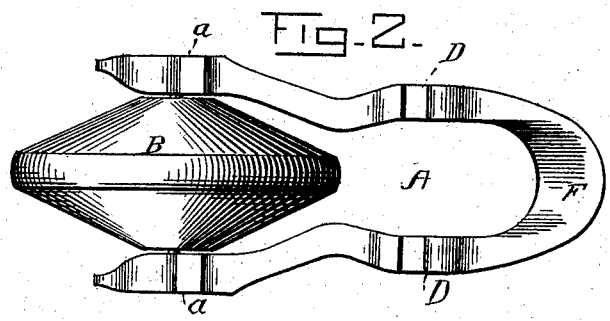
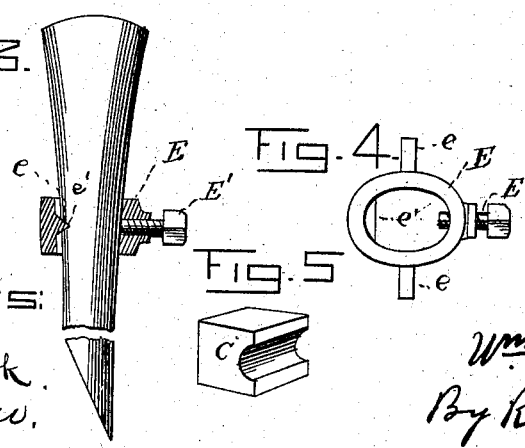
WITNESSES:
Norris H. Clark
P. B. Turpin
INVENTOR:
Wm. C. Lathrop
By R. S. & A. P. Lacey
attys.

UNITED STATES PATENT OFFICE.

WILLIAM C. LATHROP, OF MILTON CENTRE, OHIO.

GRAIN-DRILL ATTACHMENT.

SPECIFICATION forming part of Letters Patent No. 322,187, dated July 14, 1885.

Application filed March 19, 1885. (No model.)

*To all whom it may concern:*

Be it known that I, WILLIAM C. LATHROP, a citizen of the United States, residing at Milton Centre, in the county of Wood and State of Ohio, have invented certain new and useful Improvements in Grain-Drill Attachments; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has for an object to provide a roller attachment for grain-drills designed to be used in connection with each tooth of the drill.

The invention consists in the novel construction of the attachment and the combination of the same with the drill-tooth, all of which will be described and claimed.

In the drawings, Figure 1 is a side view of my improvement applied to a drill-tooth. Fig. 2 is a plan view of the frame and roller. Fig. 3 is a detail view of the tooth and collar, the latter being in section. Fig. 4 is a detail view of the collar; and Fig. 5 is a detail view of one of the bearing-blocks, all of which will be described.

The roller-supporting frame A is provided at or near its rear end with bearings $a$, for the trunnions $b$ of the roller B. These bearings are preferably enlarged mortises, provided in one end with a groove or half-bearing, and the trunnions are held in such bearing by a filling or bearing block, C, having a groove to fit over the trunnions. These blocks may be held in place by tightly fitting into the mortise. I usually make the roller B of sufficient weight to properly press the soil onto the grain.

In advance of the roller I provide the frame A with a bearing, D, similar to the bearing $a$. In these bearings I journal the trunnions $e$ of a collar, E, which is fitted to embrace the drill-tooth, and may be moved up or down to set the roller nearer to or farther from the drill-tooth, and so increase or diminish its pressure, as may be desired. This collar may be clamped at any desired point by a wedge driven between it and the drill-tooth; but I prefer to secure it by a set-screw, E', turned through it, against the tooth, and to increase this fastening it is also preferred to provide the collar internally with a binding-point, $e'$, arranged opposite the point of the set-screw. The bearing-frame is projected at F in front of the collar, forming an extension, which, when the tooth is elevated, engages the framing and prevents the roller from turning under and in front of the tooth.

The bearing-frame A may be constructed and sold together with the collar, and the roller be applied by the purchaser, and be light or heavy, according to the wishes of each user.

Numerous equivalents, as a wedge, &c., might be substituted for the set-screw E' without departing from the invention.

The collar may be set upon a drill-tooth to the point where it will properly fit the same, when it may be securely clamped thereto.

The frame may be applied in the manufacture of new drills by casting trunnions or spurs on the tooth and pivoting the arms or side bars of the frame thereon; but the construction before described is preferred, because by it the improvement may be conveniently applied to drills now in use. The roller is made bulging or convex on its opposite faces, and solid and smooth, thus leaving all the marks alike.

Having thus described my invention, what I claim, and desire to secure by Letters Patent, is—

1. An attachment for grain-drills, comprising a roller-supporting frame provided near its rear end with bearings for such roller, and a collar adapted to embrace the drill-tooth and supported in the frame in advance of such bearing, substantially as set forth.

2. In an attachment for grain-drills, a roller-supporting frame provided near its rear end with bearings for the roller, a collar journaled in the frame in advance of the bearings and fitted to embrace the drill-tooth, the frame being projected in advance of such collar to form a stop-extension, substantially as set forth.

3. The combination of a drill-tooth, a collar embracing such tooth, and provided with a set-screw by which it may be held at any desired point thereto, and a roller journaled in the said frame in the rear of the collar, substantially as set forth.

4. In a roller attachment for grain-drills, the combination, with the frame provided with bearings for the roller, of a collar fitted to embrace the drill-tooth and provided with an internal binding-point, and having opposite said point a threaded opening fitted to receive a clamping-screw, substantially as set forth.

5. The combination of the drill-tooth, the roller-supporting frame pivotally connected therewith and provided with an extension forward of the pivotal support, and a roller journaled in said frame in the rear of the tooth, substantially as set forth.

In testimony whereof I affix my signature in presence of two witnesses.

WILLIAM C. LATHROP.

Witnesses:
C. CALL,
J. W. LONG.